March 26, 1935. F. A. SMITH 1,995,365
WINDOW WING
Filed June 13, 1931
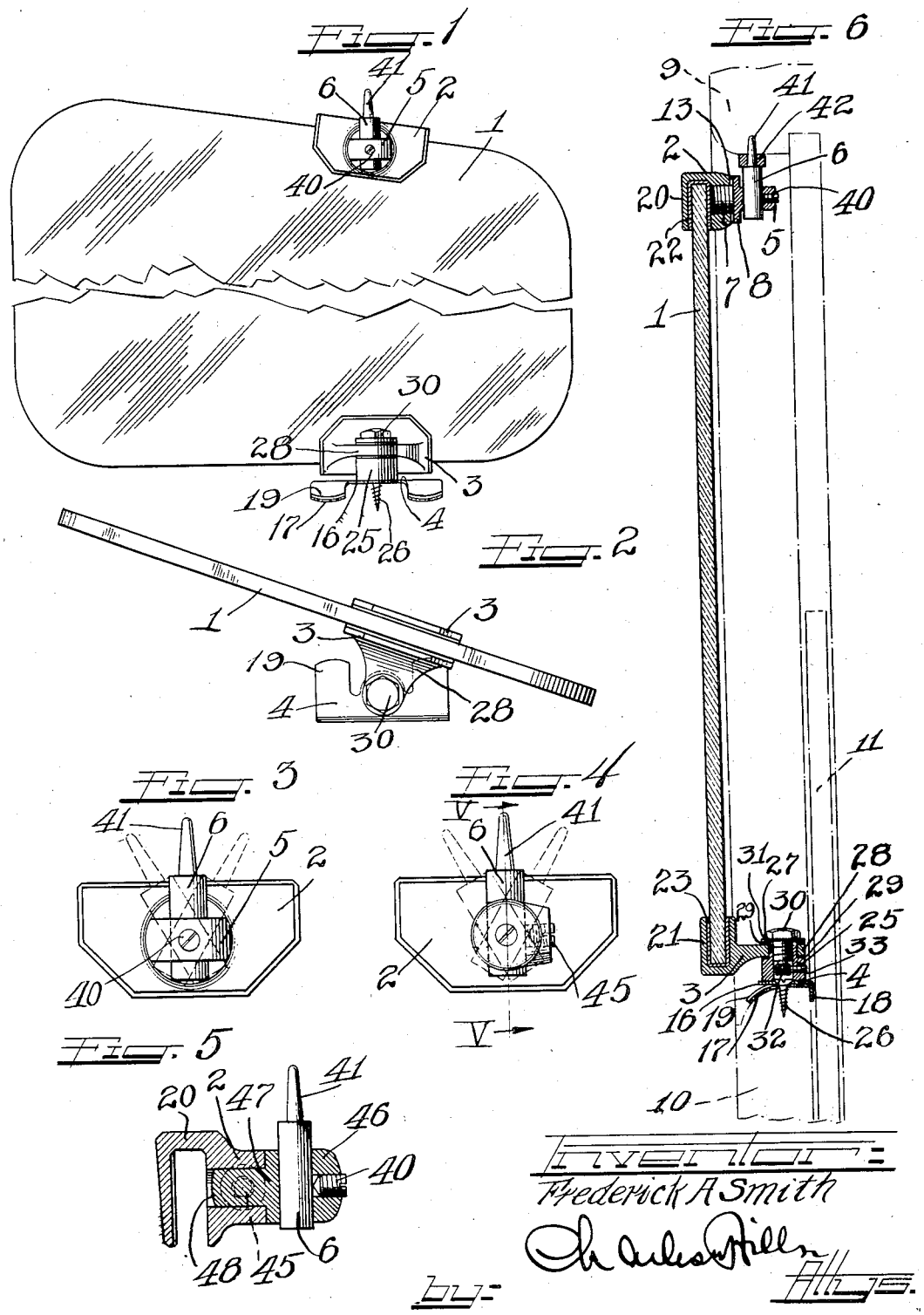
Inventor
Frederick A Smith
by Charles Hill
Attys.

Patented Mar. 26, 1935

1,995,365

UNITED STATES PATENT OFFICE 1,995,365

WINDOW WING

Frederick A. Smith, Waukegan, Ill., assignor to Oakes Products Corporation, North Chicago, Ill., a corporation of Michigan Application June 13, 1931, Serial No. 544,079

9 Claims. (Cl. 296—84)

This invention relates to improvements in supporting means for deflector shields or window wings.

More specifically, this invention relates to an improved construction of a deflector shield supporting bracket.

This invention has been contrived as a result of considerable experimentation with wind shields comprising a transparent shield preferably formed of a glass material and provided with upper and lower supporting members rigidly attached to opposite edge portions of the shield. The lower supporting member is preferably pivotally associated with a distortable bracket which is fastened to the lower reveal of a side window of an automobile or similar mobile vehicle. The upper supporting member is located in direct vertical alignment with the lower member and comprises a rigid pivot element carried by the upper supporting member and coacting directly with the upper adjacent window reveal. The pivot element of the upper supporting member preferably has screw thread coaction with an opening in a lateral extension of the supporting bracket, which opening is vertically aligned with the bore in the extension of the lower supporting member.

I have found, however, that this type of construction is limited to combination with a deflector shield having parallel upper and lower sides since the upper and lower supporting members of the shield must be in direct alignment at their pivotal connection with the upper and lower window reveals to permit adjustment of the shield. It can be readily seen that if the upper side of the deflector shield was sloped, for example, the upper supporting member would be at an angle relative to the lower supporting member. The pivotal elements of the upper and lower supports would thus be out of alignment and rotation about their axes would be impossible since in any rotatable body the pivot points must be directly aligned with each other to permit rotation if the pivot elements coact with rigid seats. The construction therefore is limited to deflector shields having parallel upper and lower sides.

I have now invented improvements in the deflector shield supporting members which are adapted to be used on any type of deflector shield irrespective of the shape or size thereof.

It is therefore an object of this invention to provide an improved deflector shield support to be used with any type of deflector shield.

It is a further object of this invention to provide a wind shield having an upper support containing a pivotal element which may be adjusted in direct alignment with the lower supporting element irrespective of the relative slope of the upper and lower edges of the shield.

Other and further important objects of this invention will be apparent from the disclosures in the specification and the accompanying drawing.

This invention (in a preferred form) is illustrated in the drawing and hereinafter more fully described.

On the drawing:

Figure 1 is a fragmentary side view of the deflector or wind shield, showing a preferred form of lower supporting member and one form of adjustable upper supporting member according to this invention, attached to the shield.

Figure 2 is a fragmentary top view of the deflector shield showing the top plane of the lower supporting member attached thereto.

Figure 3 is an enlarged side view of one form of adjustable upper swivel bracket supporting member according to this invention.

Figure 4 is an enlarged side view of another form of adjustable upper swivel bracket supporting member according to this invention.

Figure 5 is a sectional view taken substantially along the line V—V of Figure 4, with parts in elevation.

Figure 6 is a central vertical section through the deflector shield and the supporting structure therefor, showing the same mounted in the upper and lower reveals of a window structure.

As shown on the drawing:

The wind shield or window wing illustrated comprises in general a substantially transparent deflector shield 1 preferably formed of plate or shatter-proof (unbreakable) glass and having upper and lower supporting members 2 and 3, respectively, rigidly attachable to upper and lower edge portions of the shield. The lower supporting member 3 is composed of a distortable bracket 4 pivotally associated with the supporting member 3. The upper supporting member 2 contains a member 5 in threaded relation with the support 2, said member 5 carrying a pivot element 6 which is directly coactable with an adjacent window reveal. The device illustrated is especially applicable to the forward side doors of a closed type automobile but it should be understood that its use is general and is not limited to automobiles. As shown in Figure 6, the deflector shield is mounted in the upper and lower reveals 9 and 10 of a closed type automobile side window. The numeral 11 (Figure 6) represents a window partially open between the two reveals 9 and 10. It can thus be readily ascertained from this figure that by adjusting the position of the deflector shield 1 to a suitable angle, draft coming through the open portion above the window 11 may be deflected and thereby give ventilation to the occupants of the car without subjecting them to discomfort.

The supporting members 2 and 3 (Figure 6) each contain a U-shaped portion 20 and 21, respectively. The inside of the U is lined with a resilient material, such as a rubber sheet 22 and 23. The deflector shield 1 is securely fastened to the members 2 and 3 by embedding the glass in the U-shaped portion of each member and compressing the U. The resilient materials 22 and 23 interposed between the deflector shield and the metallic U portions 20 and 21 prevent the glass or breakable transparent material comprising the shield 1 from breaking. A very secure and rigid attachment is thereby obtained. If desired, adhesive materials may be used in addition to the compression to aid in attaching supporting members to the shield. Holes may be drilled through the shield and supporting members for receiving a rivet or bolt and rigid connection obtained by bolting the shield to the support.

While any type of lower supporting member may be used, I prefer to use a member containing a distortable bracket 4 pivotally mounted to the lower support 3 as shown. Bracket 4 is formed of readily bendable sheet metal and has an abutment flange 18 (Figure 6) which is adapted to hook over the inside edge of a lower reveal 10 of the window 11. The end portions of the bracket 4 may be readily bent to conform exactly with the contour of the reveal 10 which may have any curvature. Pads 17 are preferably secured to the under side of the distortable end portions 19 to avoid rattling and possible marring of the reveal. The medial portion 16 of the bracket 4 is of plane formation and a hollow pivot block 25 provided with a hollow pivot portion 27 is rigidly attached to the said portion 16 in any suitable manner such as by welding and the like. The bracket 4 is adapted to be rigidly attached to the window reveal 10 by means of a screw 26 which is accessible through the hollow pivot block 25. The pivot 27 of the pivot block 25 is adapted to coact with a vertical bore formed in a lateral extension 28 of the lower supporting member 3. The pivot 27 does not extend entirely through the extension 28.

A clamping cap screw 30 has a threaded shank coacting with screw threads formed within the pivot 27. The head of the cap screw 30 coacts with a metal washer 31 (Figure 6) to clamp the supporting member 3 in any desired axial position relative to the bracket 4 and pivot block 25. Fiber washers 29 to enhance the clamping effect may be inserted between the washer 31 and the extension 28 and also between the lower portion of pivot member 27 and the pivot block 25 as shown. The lowermost portion of the cap screw 30 may be provided with a circular member 32 formed integrally therewith and containing a series of notches circumferentially spaced around its surface. A set screw 33 which has screw thread reaction against the portion 32 of the cap screw 30 may be brought into engagement with the successive notches on the surface of the portion 32 to positively lock the said cap screw 30 in any position of adjustment.

In accordance with the features of this invention, I have shown in Figures 1, 3 and 6 one form of universal swivel upper bracket which, as pointed out above, consists of a member 5 in screw thread relation with the upper supporting member 2. The member 5 consists of a threaded portion 7, a flanged portion 8 and a flattened end portion provided with a bore and carrying a pivot element 6. Said pivot element 6 is adjustable in the bore at any point of retraction by means of a set screw 40 and is provided with a reduced neck portion 41. The reduced neck portion 41 is adapted to be inserted into a small bore or hole in the upper reveal 9 (Figure 6) and if desired a bushing 42 may be inserted between the upper reveal and the pivot member 6 to prevent the drilled hole in the window reveal from becoming worn and enlarged. A lock washer 13 is provided between the flanged portion 8 of the member 5 and the supporting member 2.

It will thus be seen from this description that an elasticity of structure is provided which enables the same type of upper bracket to be used on all types of deflector shields regardless of the slope of their upper edge. The upper and lower pivotal elements may be brought into direct alignment by an adjustment of the upper swivel bracket by merely setting the pivot member 6 in a vertical position regardless of the position assumed by the supporting member 2.

Figures 4 and 5 show an alternative arrangement of upper swivel bracket in which the pivot carrying member is not in screw thread relation with the supporting member 2 but is merely held in adjusted position by means of a pointed set screw 45. In Figures 4 and 5 a pivot carrying member 46 is provided with a reduced neck portion 47 adapted to fit tightly within a bore 48 of the supporting member 2. After the portion 46 is rotated to align the pivot end 41 with the lower supporting bracket pivot 27, it is locked in adjusted position by merely tightening the set screw 45. Thus it can be seen that either a screw thread coaction or an ordinary bushing fitting capable of being locked in position may be used in my adjustable upper swivel bracket.

From the foregoing description it will be apparent that the improved wind shield structure may be applied to window structure having reveals of various shapes to produce a compact, rigid and ready manipulatable assembly capable of being installed by any novice. The elastic structure afforded by my improved upper swivel bracket permits the use of the same type of bracket with any shaped deflector shield regardless of the slope of the top of the shield. Without an adjustable arrangement of the upper bracket, separate fittings for each individual sloping upper edge of the deflector shield would be necessary to properly align the pivot points.

When it is desired to apply the wind shield assembly to a window structure, the upper and lower reveals 9 and 10 (Figure 6) should be provided with vertically aligned holes for the reception of the screw 26 and of the pivot point 41. These relatively small holes may be drilled or punched through the solid cover of the reveal without noticeably marring the appearance of the window. The distortable end portions 19 of the bracket 4 are then bent to conform perfectly with the lower reveal surface. The flange 18 of the bracket 4 is hooked over the inside edge of the reveal and the screw 26 manipulated by removing the cap screw 30 may then be firmly driven home to rigidly apply the bracket to the reveal in proper position. After the bracket has been secured in place, the lateral extensions 28 of the lower supporting member 3 may be slipped over the upper end of the hollow pivot 27 while the upper pivot element 6 is in its utmost retracted position. The pivot element 6 may then be brought directly in line with the hole provided in the upper reveal, placed in the hole and locked in position by means of the set screw 40. When the pivot element 6 has been positioned to properly rotate in the drilled hole, the lower supporting member may then be finally positioned by inserting the cap screw 30, the fiber washers 29 having been previously inserted, and the cap screw 30 may be set to clamp the shield 1 in any desired position of adjustment. The set screw 33 may be manipulated to lock the cap screw in place thereby completing the attachment of the device. The mode of removing the windshield will be readily apparent from the description of the installation and it is apparent that the entire operation of installation and removal can be carried out by a novice without the aid of specially designed tools, a screw driver and a drill being all that is necessary to install the entire assemblage.

I am aware that many changes may be made and numerous details of construction may be varied through a wide range without departing from the principles of this invention, and I, therefore, do not propose limiting the patent granted hereon otherwise than necessitated by the prior art.

I claim as my invention:

1. In combination, a deflector shield, a supporting member attached to said shield, an extension member in screw thread relation with said supporting member and rotatable on an axis at right angles to said deflector shield, an adjustable pivot element carried by said rotatable extension member and means to lock said pivot element in adjusted position.

2. In combination, a deflector shield, supporting members secured to the upper and lower edges of said shield, a window having upper and lower reveals, a bracket engaging the latter of said reveals and pivotally associated with the lower of said supporting members, means for rigidly attaching said bracket to said reveal, a slidable pivot element rotatably adjustable on an axis at right angles to said deflector shield coacting with said upper supporting member and means for locking said slidable pivot element to directly engage one end thereof in a hole provided therefor in the upper of said reveals.

3. In combination, a window having upper and lower reveals and aligned holes formed therein, a deflector shield having supporting members provided with lateral extensions extending in proximity to said holes, a pivot element rotatably mounted in one of said supporting members on an axis at right angles to said deflector shield directly engaging one of said holes, and a bracket pivotally associated with the other of said extensions and rigidly attached at the other of said holes.

4. In combination, a deflector shield, a U-shaped supporting member adapted to be placed over an edge of the shield and be rigidly attached to said shield, a hollow neck portion integral with said supporting member extending at right angles from said deflector shield, a pivot carrying element terminating short of the shield rotatably mounted in said hollow neck, and a pivot extending at right angles from said rotatable element, said pivot being designed for direct pivotal engagement with a window reveal.

5. A mounting for a deflector shield comprising a U-shaped clamping member, a neck portion integral with said U extending from one side thereof, a bore in said neck portion, a pivot carrying element terminating short of the clamping member rotatably mounted in said bore, a set screw extending through said neck to lock said pivot carrying element in adjusted position and a pivot adjustably mounted in said carrying element, said pivot being designed for direct pivotal engagement with a window reveal.

6. The combination with a window wing having an upper sloping edge and adapted for mounting directly on the reveals about a vehicle window opening, of a member rigidly connected along the upper edge of the window wing, a rotatable element extending at right angles from said member, and a pivot element in said rotatable element to directly engage the upper reveal of the window opening and being adjustable into alignment with the pivotal axis.

7. A window wing for mounting on the upper and lower reveals about a vehicle window opening which comprises, a deflector shield, an upper supporting member rigidly secured along the top of said shield, a member rotatable in said upper supporting member at right angles thereto, a bore in said rotatable member, a pivot for directly engaging an upper reveal slidable in said bore, means for securing said pivot in adjusted position, a lower supporting member rigidly secured along the bottom edge of said shield, an integral arm on said support extending at right angles from the shield, a bore in said arm near the end thereof, a bracket member secured to the lower reveal and a pivot extending from the bracket through the bore in said arm.

8. In combination, a deflector shield, supporting members secured to opposite edge portions of said shield, a bracket having a pivot coacting with a bore in one of said members, a rotatable element in screw thread relation with the other of said supporting members, and a pivot carried by said rotatable element and adjustable relatively to said element.

9. In combination, a deflector shield, supporting members secured to opposite edge portions of said shield, a bracket having a portion thereof pivotally associated with one of said members, another portion of said bracket being distortable to fit various forms of window reveals, and an adjustable pivot element carried by the other of said members and bodily movable about both its axes relatively to said other member.

FREDERICK A. SMITH.